(No Model.) 5 Sheets—Sheet 1.

G. BRESSE.
HEEL MACHINE.

No. 327,652. Patented Oct. 6, 1885.

Witnesses
Alfred A. Simpson.
A. M. A. Simpson

Inventor
Guillaume Bresse
By his Attorney
Charles G. C. Simpson (No Model.) 5 Sheets—Sheet 2.
G. BRESSE.
HEEL MACHINE.
No. 327,652. Patented Oct. 6, 1885.
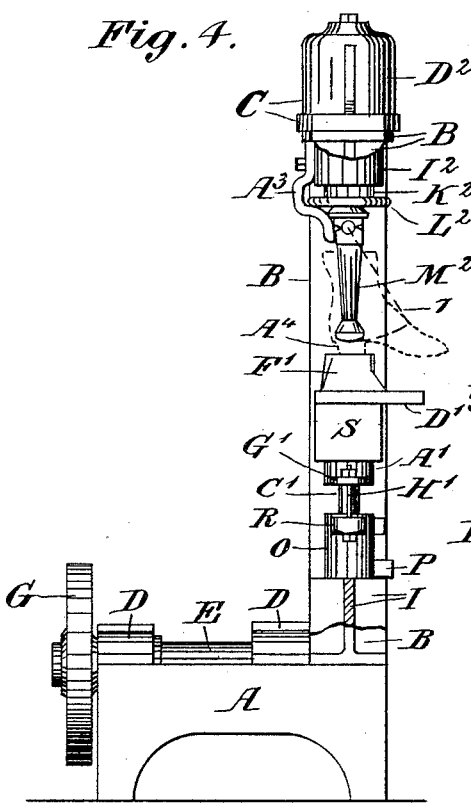
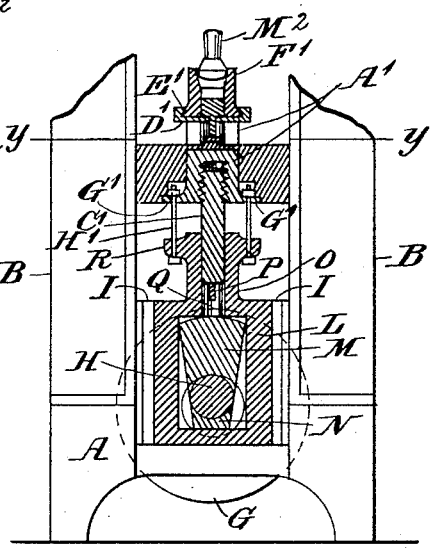
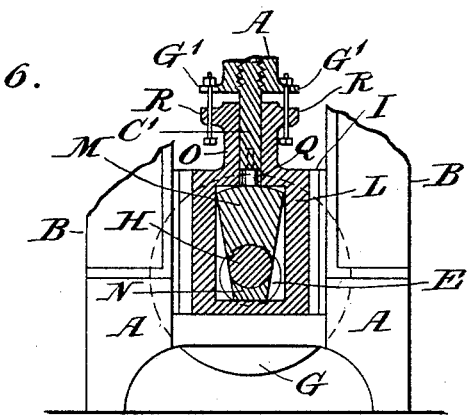
Witnesses.
Alfred A. Simpson.
A. M. A. Simpson
Inventor.
Guillaume Bresse
By his Attorney Charles G. C. Simpson (No Model.)  5 Sheets—Sheet 3.

G. BRESSE.
HEEL MACHINE.

No. 327,652.  Patented Oct. 6, 1885.

Witnesses.
Alfred A. Simpson.
A. M. A. Simpson

Inventor
Guillaume Bresse
By his Attorney
Charles G. C. Simpson (No Model.) 5 Sheets—Sheet 4.
G. BRESSE.
HEEL MACHINE.

No. 327,652. Patented Oct. 6, 1885.

Witnesses.
Alfred A. Simpson
A. M. A. Simpson

Inventor.
Guillaume Bresse
By his Attorney
Charles G. Simpson (No Model.)  5 Sheets—Sheet 5.

G. BRESSE.
HEEL MACHINE.

No. 327,652.  Patented Oct. 6, 1885.

Witnesses.
Alfred A. Simpson.
A. M. A. Simpson

Inventor.
Guillaume Bresse
By his Attorney
Charles G. C. Simpson

UNITED STATES PATENT OFFICE.

GUILLAUME BRESSE, OF QUEBEC, QUEBEC, CANADA.

HEEL-MACHINE.

SPECIFICATION forming part of Letters Patent No. 327,652, dated October 6, 1885.

Application filed June 4, 1885. Serial No. 167,573. (No model.)

*To all whom it may concern:*

Be it known that I, GUILLAUME BRESSE, of the city of Quebec, in the district of Quebec, province of Quebec, Canada, have invented new and useful Improvements in Heel-Machines; and I do hereby declare that the following is a full, clear, and exact description of the same.

This invention has reference to the construction and arrangement of that class of machines capable in one operation or by one of its strokes to nail on the heel to the sole of the boot or shoe, also to put in the nails required to be placed flush with the surface or face of the heel for the purpose of giving the heel greater durability against wear; and with the same stroke of the machine that drives the nails as aforesaid, the machine is arranged so that the front surface of the heel will be cut or shaved down to the desired size and shape. Furthermore, with the same one stroke of the machine the heel is compressed within a mold, thereby bringing the heel into shape, whereby the labor of trimming the heel to shape on the back and sides is either entirely dispensed with or very much reduced, this being dependent upon the degree of finish that may be desired, and to some extent on the shape to be imparted to the heel. Thus ordinary heels of boots, &c., may be brought to the desired shape with this machine, while others of more elaborate configuration and finish will have the work of bringing them to the required shape much reduced.

The particular features or combinations of elements which form the present invention will be hereinafter fully set forth and claimed.

Figure 1:
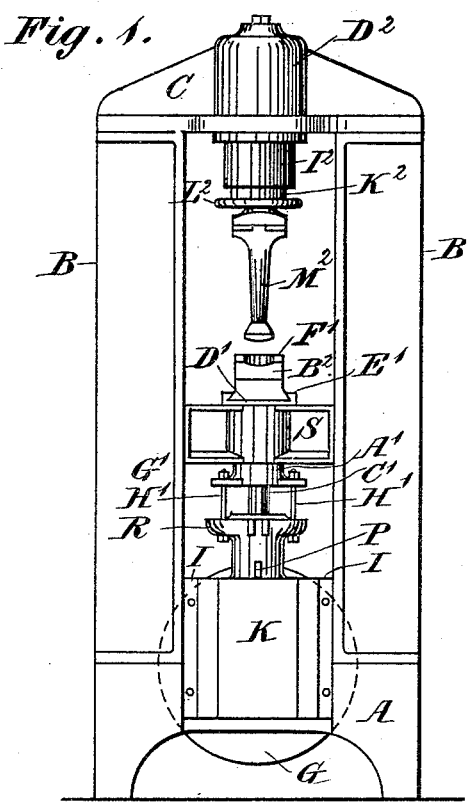
Figure 3:
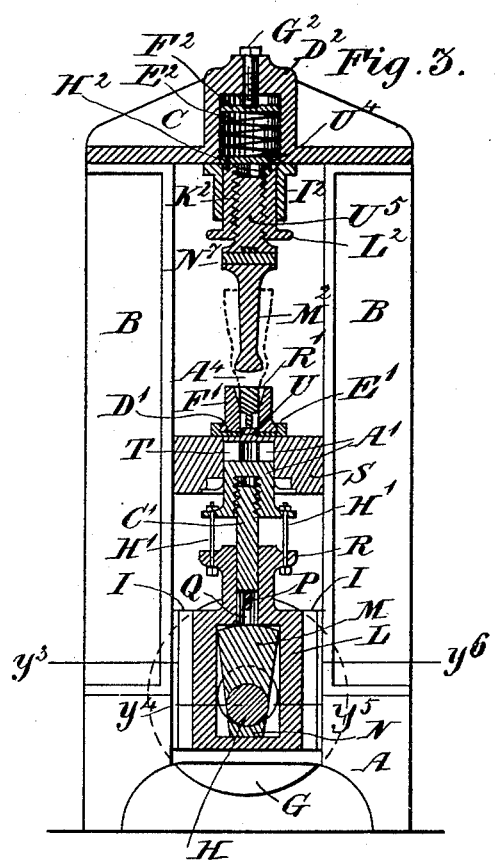
Figure 2:
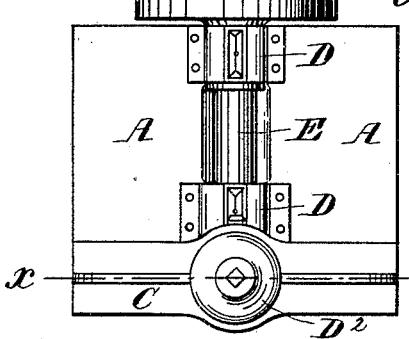
Figure 13:
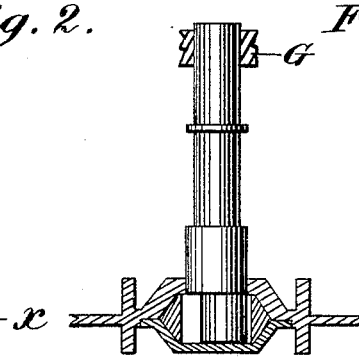
Figure 7:
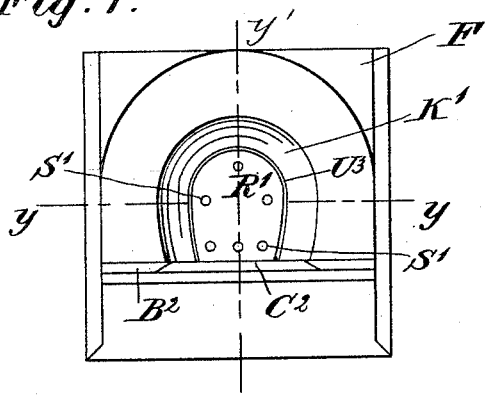
Figure 10:
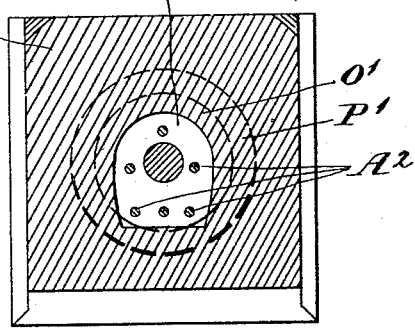
Figure 8:
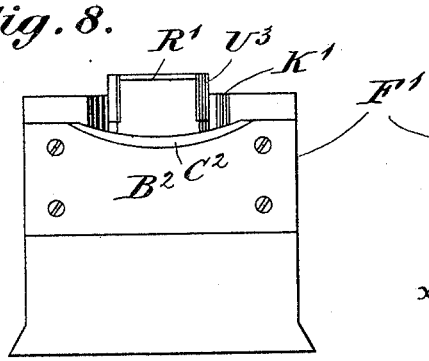
Figure 9:
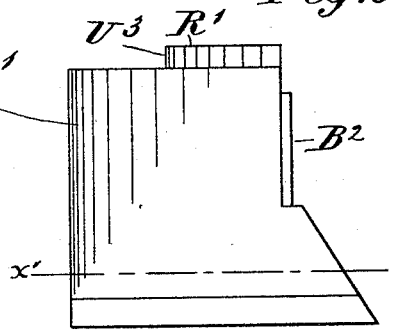
Figures 11, 12:
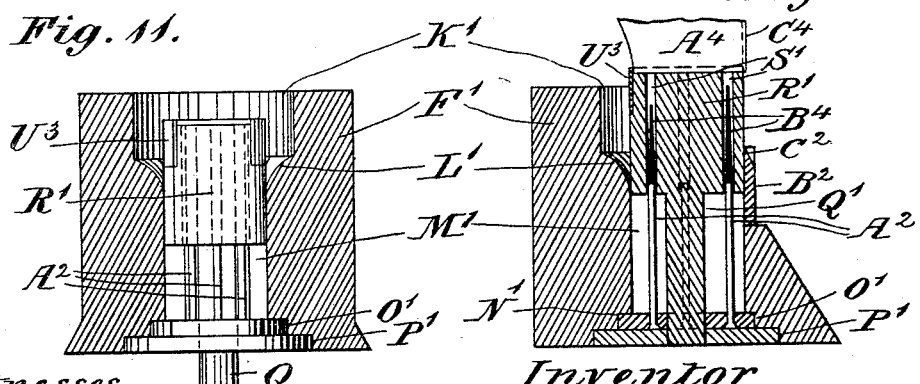
Figure 14:
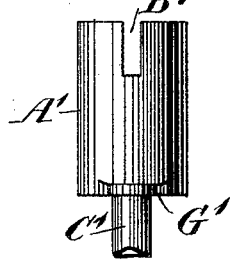
Figure 16:
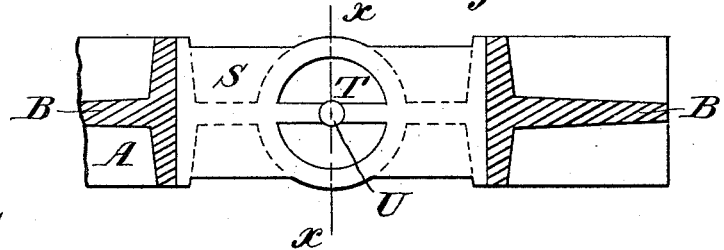
Figure 15:
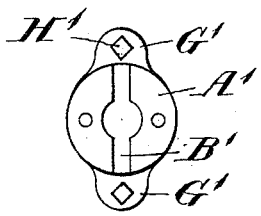
Figure 17:
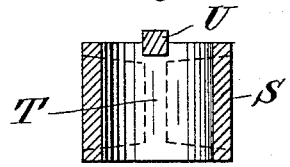
Figure 18:
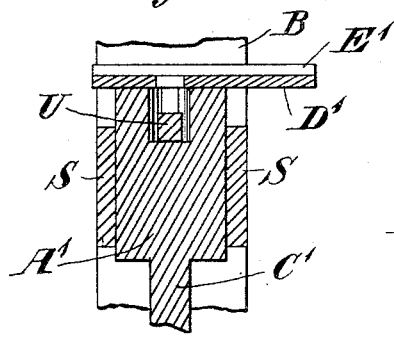
Figures 19, 20:
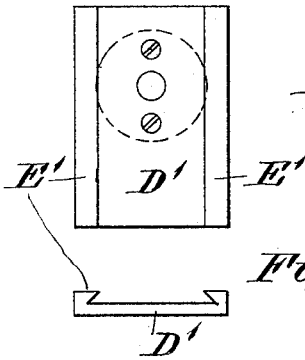
Figure 21:
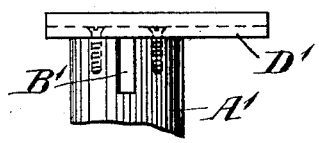
Figure 22:
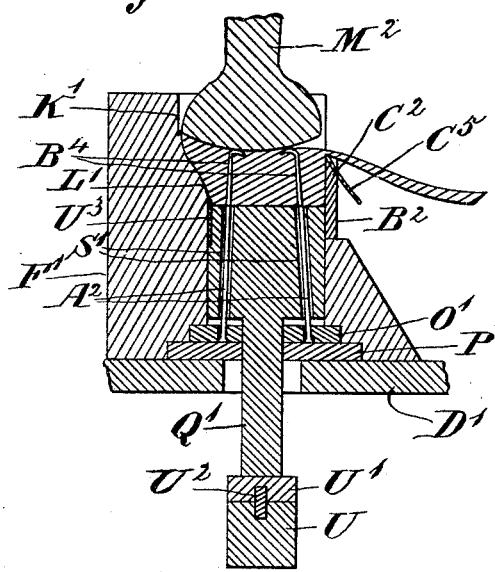
Figure 23:
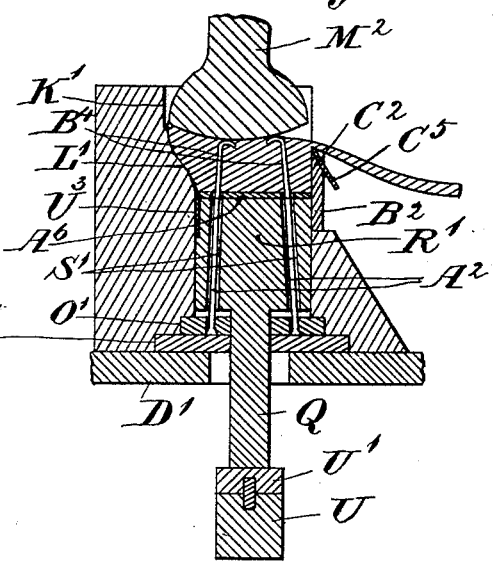
Figure 24:
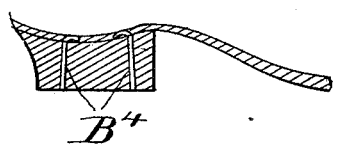
Figure 25:
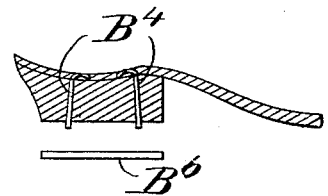
Figure 26:
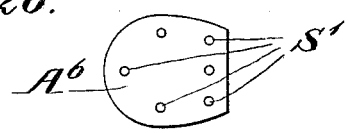
Figure 27:

In the drawings hereunto annexed similar letters of reference indicate like parts, and Figure 1 is a front elevation of a machine embodying my invention. Fig. 2 is a plan of the machine shown in Fig. 1. Fig. 3 is a vertical sectional elevational view of the machine, the sectional part being taken on line $x$ $x$, Fig. 2. Fig. 4 is a side elevation of the machine shown in Fig. 1, with a portion of the upper frame removed to show the working parts more clearly. Figs. 5 and 6 are vertical sectional views of the machine shown in Fig. 1 on line $x$ $x$, Fig. 2, to assist in showing the operation of some of the working parts. Fig. 7 is a plan of mold and plunger F'. Fig. 8 is a front elevation of the parts shown in Fig. 7. Fig. 9 is a side elevation of the parts shown in Fig. 7. Fig. 10 is a horizontal section on line $x'$, Fig. 9. Fig. 11 is a vertical section of mold on line $y$, Fig. 7, and elevation of parts contained within said mold. Fig. 12 is a vertical section on line $y'$, Fig. 7. Fig. 13 is a part horizontal section on line $y^3$ $y^4$ $y^5$ $y^6$, Fig. 3, showing in connection therewith a plan of the shaft E. Fig. 14 is a side elevation of the plunger A' and parts of neck $C^2$. Fig. 15 is a plan or top view of plunger A'. Fig. 16 is a plan of cross-bar S and section of standards B, taken at about the level of line $y$, Fig. 5, the plunger A', plate D', and mold F' being removed. Fig. 17 is a cross-section on line $x$ $x$, Fig. 16. Fig. 18 is a cross section on line $x$ $x$, Fig. 16, with plunger A' and plate D' in place therewith. Fig. 19 is a plan of plate D'. Fig. 20 is a side elevation of plate D', and end of plunger A' shown in connection therewith. Fig. 21 is an end elevation of plate D'. Fig. 22 is a sectional view of the mold F', plunger R', and other parts in elevation therewith connected in the relative position they assume in relation to a heel of a boot or shoe at the time when the end of the stroke of the machine is arrived at. Fig. 23 is a similar view of the operation of the machine to that shown in Fig. 22, but modified to act upon heels that are to be finished with plain "top-lifts" or plain-faced heels in which the nails do not appear. Fig. 24 shows the result of the operation delineated in Fig. 22. Fig. 25 shows the result of the operation delineated in Fig. 23. Fig. 26 is a plan of the supplementary plate $A^6$. Fig. 27 is an illustration of how the heel shown in Fig. 25 is finished.

Letter A represents a bed, upon which is erected two standards, B, carrying an upper cross-beam, C.

In the bed A bearings D are formed in which a shaft, E, revolves on journals in the ordinary manner, being operated by power applied to a pulley, G, secured upon the shaft E. On the opposite end of the shaft E to that on which the pulley G is secured an eccentric, H, is formed integral with the shaft.

I is a slide-casing situated between the lower part of the standards B and in front of the bed A. This slide casing may, if desired, be made integral with the standards B, as shown in Fig. 13, or separate therefrom.

The slide-casing I is provided with a cover, K, forming thereby a complete guide to a pitman, L. The eccentric H is connected with the pitman by means of a rocking block, M, and slide-block N in an ordinary manner; and as, *per se*, no invention is claimed in this arrangement for operating the pitman, it is not necessary further to describe it; and, further, a pitman operated by any device and arranged to have the requisite stroke for the functions about to be described will answer my purpose.

The pitman L is provided with a neck, O, having a keyway and key, P, therein. This neck O is provided with a vertical central bore, Q, and at its top with flange-projections R. Between the standards B is secured a cross-bar, S. (Shown in front elevation in Fig. 1 and in section in Figs. 3 and 5.)

Within the cross bar S a hollow cylinder, T, is formed, also a bridge-piece, U, (see Figs. 16 and 17,) situated at the top of the cylinder and extending transversely of the machine.

Within the cylinder T a plunger, A', is situated. This is shown in elevation in Fig. 14 and plan in Fig. 15. It is provided with a slot-opening, B', extending across it, as shown, and of suitable size, so that when the plunger A' is placed in the cylinder T it is guided by the cylinder, and its upper ends are enabled to pass up and project above the upper surface of the cross-bar S in the manner shown in Figs. 5 and 18.

The neck C' of the plunger is received within the central bore, Q, and as the pitman rises and falls by reason of the motion imparted to it from the eccentric H by the blocks M and N, the neck C' slides freely within the neck O. This neck is preferably screwed into the plunger A', as shown in Figs. 3 and 5, whereby it may be adjusted in length of projection below the plunger, and thus adjust the height of the stroke through which the plunger A' moves. On the top of the plunger A' is secured a plate, D', having dovetailed guiding-edges E', as shown in Figs. 3, 5, 19, 20, an 21, for holding in place a mold, F', as shown in Figs. 1, 3, 4, and 5.

On the bottom of the plunger A' are formed flange-projections G'. Through these and projections R bolts H' are passed for causing the plunger A' to descend and draw the plate D' and mold F' down after they have been raised.

The mold F' is constructed as follows: It consists of a block of metal of the configuration shown in Figs. 7 to 12, having a central opening, I', of varying configuration and size at different heights. At the top part, K', the opening is of the configuration of the heel of a boot or shoe, but made considerably larger. The next part, L', of the opening I', situated immediately below the part K', is of bell-mouth configuration, as shown, the curve of the bell-mouth being formed in size to agree with the concave configuration to be imparted to the sides and back surface of the heel from the face to the upper. The next lower portion, M', of the opening I' is the size and configuration of the face of the heel. This portion M' is parallel down to N', where it is enlarged to receive two plates, O' and P', which will be secured to the mold in any ordinary way. Through the plates O' and P' central openings are formed for the neck Q' of the plunger R' to pass through and slide freely. The top surface of the plunger R' forms a movable bottom in relation to the mold proper. This plunger is made to fit but slide freely within the parallel portion M' of the opening I'. In it holes S' are formed. These are in number and location made to agree with the number of nails and the location that they are desired to be placed in in the heel for attaching the heel to the sole and for prolonging the durability of the face of the heel. As delineated, six holes S' are shown, (see Fig. 7,) but their number may be increased or diminished, as desired.

With regard to the holes S' they may be slightly inclined toward the center of the plunger R', as shown in Figs. 22 and 23, or they may be parallel with the line of the said plunger, as shown in Fig. 12, according to the position in which it is desired to drive the nails into the heel.

In the plate O' corresponding holes are formed to the holes S', and in them are placed small rods A².

When the mold F' is in place, as shown in Figs. 1, 3, 4, and 5, the end of the neck Q' rests upon the bridge-piece U or on a supplementary piece, U', when such is used, the two being held together by a dowel-pin, U², and when the plunger A' is down, as shown in Fig. 3, the plunger R' and parts within the mold are in the position shown in Fig. 12.

The front side of the opening I' is formed by a steel plate, B², provided with a beveled portion, C², suitably configurated for trimming the front vertical surface of the heel. This bevel C² is sharpened up to a knife-edge.

The upper end of the plunger R' is reduced, and upon the reduced part is attached a plate or band, U³, projecting above the plunger. This serves as a guide for placing the heel of the boot or shoe in its proper position upon the plunger, as will be hereinafter described.

Integral with the cross-bar C, and centrally situated therein, a cylinder, D², is formed. In this is placed a spiral, rubber, or other spring, E², and above this spring a follower-plate, F², actuated by a screw, G², to increase or diminish the tension of the said spring by the raising or lowering of the screw G², and consequent change of position of the follower-plate F². Under the spring E² is placed a second follower-plate, H², and on the under side of the cross-bar C is secured a hollow cylinder, I², of somewhat smaller bore than that of the cylinder D². This cylinder is thereby enabled to prevent the follower-plate H² from descending lower than the top of the cylinder I². Within the cylinder I² a cylindrical plunger, K², is placed, fitting the same, but sliding freely therein.

The follower H² and cylinder K² are united together by screws U⁴, by which the cylinder K² is retained from descending lower than the position shown in Figs. 1, 3, and 4.

It will be observed that the plunger K² is longer than the cylinder I². This will be made as much longer as is required to compress the spring E² the required amount. The plunger K² is also provided with a flange, L², to govern the distance that the plunger K² can be thrust upward into the cylinder I² and D². A screwed opening is formed centrally in the plunger, which opening is provided with a screw-thread, and to it is fitted the screwed neck U⁵, having an arm, M², hinged thereto by a hinge at N⁷, in such a manner that it is enabled to swing forward, as indicated by the dotted line 1 and arc of a circle in Fig. 4. The bottom face of the arm is configurated to agree with the inner surface of the sole within the boot or shoe, and otherwise arranged for the nails which pass through both heel and sole to clinch upon.

Attached to the cylinder I² is a bent bar, A³, arranged as shown in Fig. 4. This bar prevents the arm M² from passing the vertical position it is shown in in Fig. 4.

The operation of the invention is as follows: The key P being withdrawn so as not to come in contact with the neck C′, the shaft E is rotated by power applied to the pulley G. The arm M² is moved forward to the position as shown by the dotted line 1 in Fig. 4. The holes S′ are then supplied with the nails B⁴, head downward, (see Fig. 12,) both for nailing on the heel to the sole and for giving greater durability to the face of the heel. It will be observed that one of the nails B⁴, (shown in Fig. 12,) is considerably longer than the other. The long ones are supposed to be of the proper length for passing through the heel and sole and clinching upon the under surface of the arm M², while the shorter nails will be of any such length as may be desired. A boot or shoe is then placed on the arm M², whereupon the arm is returned to the vertical position. In this position the heel A⁴ rests with its face upon the plunger R′, being guided to the exact position by the band U³. The key P is now pushed into place so as to connect the pitman L with the plunger A′ through neck C′, and by one revolution of the eccentric H raise the plunger A′ from the position shown in Figs. 3 and 4 to that shown in Fig. 5, and return it to the first-mentioned position. The plate D′, attached on the top of the plunger A′, and mold F′, situated on the said plate, are raised by the plunger, thus bringing the mold up so that its inclined, curved, or bell-mouth sides L′ press upon the sides and back of the heel and compress them, while the knife-edge C² cuts off any portion that projects beyond what is required on the front of the heel, as indicated by the dotted line C⁴ in Fig. 12, and by the piece C⁵ in Figs. 22 and 23. As soon as the plunger A′ has made a complete stroke up and down, the key P is again withdrawn to stop the motion of the mold, while the boot or shoe is removed and another put in place.

The spring E² allows the arm M² to yield a small amount for the purpose of preventing the action of compressing the sides and back of the heel by the mold F′ from being too suddenly performed.

By making the stroke given by the eccentric H to the pitman L greater than the distance between the bottom surface of the cylinder I² and flange L², if desired, the compression of the heel may not only be caused by the spring E², but by the said flange resting against the lower edge of the said cylinder during the last part of the upward stroke of the mold.

By the screw G² the spring E² may be compressed in the ordinary manner to such an extent as to cause its resistance alone to perform the operation through the arm M², and with the mold F′ compressing the sides and back of the heel.

With the upward movement of the mold the rods A² are raised in the holes S′ until their upper ends touch the under side or face of the heel, driving with their upward movement the nails hereinbefore mentioned into the heel, as shown in Fig. 22. Thus driving the nails, compressing the heel, and trimming its front surface are all performed by one stroke of the machine.

The plunger R′ is stationary. Its neck Q′ rests continuously on the bridge-piece U, or supplementary piece U′.

The bolts H′ insure the drawing down of the plunger A′ (after it has been raised) to the position shown in Fig. 3.

It is evident that the above-described operations could be performed by other modifications of mechanism than those hereinabove described—as for example, the mold F′ and parts connected with it—viz., rods A²—might be stationary, while the arm M² and plunger R′ are arranged to be actuated by a pitman, in which case the heel of the boot or shoe would simply be thrust into the mold, instead of the mold and rods A² raised to perform the hereinbefore-described functions.

To enable the machine to operate upon different thicknesses of heels a number of supplementary pieces U′ are provided of different thicknesses for the thickest or highest heels that are capable of being treated by the machine. The supplementary piece U′ may be altogether dispensed with and the neck Q′ allowed to rest directly on the bridge-piece U. Again, the change of thickness of the heel may require an adjustment of the height of the arm M². This is provided for by bringing the arm M² to a neck, U⁵, screwed into the plunger K², for by screwing or unscrewing the neck the position of the arm M² may be adjusted to the amount of half a thread of the screw with which it is provided. These two adjustments above mentioned having been made to suit the thickness of the heel and the part of the sole to which the heel is attached, the stroke of the mold F' in relation thereto may be next adjusted. This adjustment has been hereinbefore mentioned, and is obtained by screwing the neck C' more or less into the plunger A'.

A fourth adjustment is also obtained—viz., that of the length of stroke that the pitman L will impart to the mold. This is obtained by the last-mentioned adjustment, and also by using a broader or narrower key P, so that only such portion of the motion of the pitman will be imparted to the plunger A' as is desired.

To enable the machine to do the work required on boot or shoe heels having what are called "blind heels"—that is to say, heels in which the nails do not appear in the "top lift," this top lift being the bottom ply of the heel forming the face of the heel—for this purpose a supplementary plate, $A^6$, is provided with holes S' agreeing with those S' in the plunger R'. This plate is a little less in thickness than the top lift, and is placed upon the top of the plunger R' before the boot or shoe heel to be treated by the machine, so that in this position the holes S' in the plate $A^6$ form continuations of the holes S' in the plunger R', as shown in Fig. 23. The heel and boot or shoe are then placed in the machine, as hereinbefore described, and the machine operated as hereinbefore described; but the result will be that shown in Fig. 25, where the nails $B^4$ are left projecting a small amount below the bottom of the heel to attach the top lift upon. The plate $A^6$ is removed from the machine and the top lift $B^6$ put in the place of the plate $A^6$. The heel and boot or shoe are then placed in the proper relation therewith and the machine again operated one stroke, the result being that the top lift is pressed onto the projecting ends of the nails, as shown in Fig. 27, whereas without the use of the plate $A^6$ the result would be that shown in Fig. 24.

To enable the machine to be applied to heels of different configuration and sizes of face surface and different location of nails, a number of molds F' of various sizes, as required, and plungers R', with variously-situated holes S', and rods $A^2$, and height of knife-edge $C^2$, may be provided to the machine.

What I claim and wish to secure by Letters Patent is as follows:

1. The combination of the adjustable spring $E^2$, plunger $K^2$, having resisting-arm $M^2$ hinged thereto, mold F', having surface L', and knife-edge $C^2$, plunger R', having holes S', and rods $A^2$, with an operating mechanism, the whole substantially as described, for the purposes set forth.

2. The combination of the rigidly-retained cylinder $D^2$, screw $G^2$, followers $F^2$ and $H^2$, spring $E^2$, cylinder $I^2$, plunger $K^2$, having a screwed neck, $U^5$, placed therein, hinge $N^7$, resisting-arm $M^2$, and bar $A^3$, the whole constructed and arranged substantially as described, for the purposes set forth.

GUILLAUME BRESSE.

Witnesses:
S. P. VALLÉE,
ALF. LECLERC.